United States Patent [19]

Rogers

[11] 4,152,166

[45] May 1, 1979

[54] ZIRCON-CONTAINING COMPOSITIONS AND CERAMIC BODIES FORMED FROM SUCH COMPOSITIONS

[75] Inventor: Maurice G. Rogers, Nechells, England

[73] Assignee: Foseco Trading AG., Switzerland

[21] Appl. No.: 780,616

[22] Filed: Mar. 22, 1977

[30] Foreign Application Priority Data

Mar. 29, 1976 [GB] United Kingdom ............... 12584/76

[51] Int. Cl.$^2$ .............................................. C04B 35/52
[52] U.S. Cl. ........................................ 106/43; 106/56; 106/57
[58] Field of Search .............................. 106/57, 43, 56

[56] References Cited

U.S. PATENT DOCUMENTS

| | | |
|---|---|---|
| 2,746,874 | 5/1956 | Whittemore ............................ 106/57 |
| 3,181,958 | 5/1965 | Thomas .................................. 106/57 |
| 3,811,907 | 5/1974 | Scammon et al. ..................... 106/299 |
| 4,053,320 | 10/1977 | Williamson et al. ................... 106/57 |

*Primary Examiner*—James Poer
*Attorney, Agent, or Firm*—Caesar, Rivise, Bernstein & Cohen, Ltd.

[57] ABSTRACT

Zircon-containing bodies of very high density and resistance to thermal shock can be made by firing a mixture of comminuted plasma dissociated zircon and an alkaline earth metal oxide and/or transition metal oxide.

8 Claims, No Drawings

ZIRCON-CONTAINING COMPOSITIONS AND CERAMIC BODIES FORMED FROM SUCH COMPOSITIONS

This invention relates to zircon-containing compositions and ceramic bodies formed from such compositions.

Most conventional zircon ceramic bodies have a porosity of the order of 18-25%, and they are coarse-grained and hence difficult to machine to a high surface finish. Lower porosity bodies (of the order of 12-18%) can be produced using micronised zircon but these bodies have reduced thermal shock resistance.

Fully-dense or zero porosity zircon bodies having a fine grain structure can only be produced by hot pressing techniques or by debasing the zircon with substantial quantities (of the order of 15-20%) of a refractory glass phase. Hot pressing techniques make the zircon bodies expensive and generally uneconomic while zircon bodies containing a glass phase (zircon porcelains) have limited application since they have very poor thermal shock resistance and cannot be used above 1000° C. due to their glassy bond.

In certain applications, particularly in the metallurgical industry, zircon ceramic bodies are desirable which are capable of withstanding substantial thermal shock but which are of very low (less than 5%) porosity (calculated based on absolute and observed densities) and essentially impermeable to air.

It has now been discovered that the use of a certain form of zircon and selected additives gives compositions which can be fired to form ceramic bodies having improved properties.

According to a first feature of the present invention there is provided a composition comprising comminuted plasma dissociated zircon and a minor proportion of an oxide of an alkaline earth metal or transition metal.

According to a second feature of the invention there is provided a method of making a zircon containing ceramic body which comprises forming to shape a composition as just defined and drying and firing the composition. Forming to shape may be assisted by incorporation into the composition of an organic binder. The present invention also includes ceramic bodies so made.

Plasma dissociated zircon consists of an intimate mixture of zirconia and silica in the form of monoclinic zirconia microcrystals in an amorphous silica glass and is produced by the treatment of zircon sand with a plasma torch. Equipment suitable for the production of plasma dissociated zircon is described in British Patent Specification No. 1248595 and U.S. Pat. No. 3,708,409. Further data concerning this material is found in U.S. Pat. Nos. 3,749,763 and 3,811,907. In plasma dissociated zircon the ratio of zirconia to silica is virtually the same as in the original zircon from which the plasma dissociated zircon is formed. The plasma dissociated zircon is preferably comminuted by dry milling to a particle size of less than 0.053 mm.

Examples of alkaline earth metal oxides which may be used are calcium oxide, barium oxide, strontium oxide and magnesium oxide. Examples of suitable transition metal oxides are iron oxide, cobalt oxide, nickel oxide, titanium oxide, chromium oxide and manganese oxide. The preferred particle size of the alkaline earth or transition metal oxide is less than 0.053 mm.

The compositions can be formed by a variety of methods including casting and compaction. If desired lightweight castable materials may be formed by foaming the compositions prior to casting. The compositions may also be used in the form of granules, fibres or coatings.

The amount of alkaline earth or transition metal oxide present in the composition will usually be in the range 0.5-5% of the weight of plasma dissociated zircon but the actual amount used will vary depending on the particular oxide and its particle size, on the particle size of the plasma dissociated zircon, and on the temperature at which the composition is fired after forming. Preferably, when the oxide used is a transition metal oxide, it is present in the composition in an amount of 0.5 to 4% by weight. Usually the composition will be adjusted so as to give a porosity after firing at firing temperature in the range 1350°-1500° C. of at most 5%.

The level of alkaline earth or transition metal oxide should be kept to a minimum where thermal shock properties are important since if too much is present in the composition the thermal shock properties deteriorate.

In the case of iron oxide the most preferred amount in the composition is 0.5 to 1.5% of the weight of the plasma dissociated zircon and in the case of magnesium oxide 1 to 3% of the weight of the plasma dissociated zircon.

When the compositions of the invention are formed and fired at between 1350° C. and 1500° C. the zirconia and silica recombine to form zircon and the resulting zircon compositions are better than known zircon based compositions in that they have a higher density, lower porosity and greater thermal shock resistance, and in metallurgical applications they are more resistant chemically to attack by fluxes and slags, and more erosion resistant to molten metal.

The compositions may include other refractory materials or aggregates such as mullite, fused alumina, deadburnt magnesite, undissociated or ordinary zircon, graphite or silicon carbide to modify the properties of the final ceramic bodies.

The compositions are suitable for making ceramic bodies for various applications in a wide variety of industrial uses, examples of which are listed below:

Metallurgical Uses

Standard bulk refractories, e.g. roof, ladle lining, well and feeder blocks. Plunging bells.

Pouring nozzles, shrouds, sliding gate valves, stoppers.

Hot blast mains for blast furnaces.

Bottom plate inserts.

Crucibles.

High Temperature Uses

Insulation.

Heat Exchangers.

Pyrometer and thermocouple sheaths.

Burner blocks and quarls; radiant gas burners.

Venturis, jet nozzles and liners, gas turbine components.

Furnace uses, kiln furniture, muffle-tubes, setting plates (e.g. for titanates, ferrites), setting sand.

Catalyst supports.

Abrasion resistant

Incinerator refractories.

Glass tank refractories.

Electrical Uses

Insulators, high voltage insulators, spark plugs, ignitors, valve bases, vacuum tube spacers, resistor bases, microwave attenuators, printed circuit and thick film substrates.

Mechanical Uses
Shaft bearings, wire-drawing dies, extrusion dies.
Textile guides.
Sand blasting nozzles, abrasion resistant inserts for powder conveyors, cyclone linings.
Grinding media, mill linings.
Bond for grinding Wheels.
Chemical Uses
Chemical stoneware.
Pump seals.
Tower packings.
Filters, diffusers, aerators, absorbers, electrolytic diaphragms.

The following examples will serve to illustrate the invention:

EXAMPLE 1

99% by weight plasma dissociated zircon (all less than 0.053 mm) and 1% by weight iron oxide (all less than 0.053 mm) were blended together and an 8% by weight aqueous solution of an organic binder comprising a 50/50 by weight mixture of polyethylene glycol and polyvinyl alcohol was added with mixing until a uniform plastic mass was obtained. Further amounts of the blend of plasma dissociated zircon and iron oxide were then added to the plastic mass and mixing continued until the mass broke up into a free-flowing granular powder.

Using a suitable die set and a 150 ton press the powder was compacted by pressing at a maximum pressure of 560 Kg/cm$^2$ to form a nozzle.

After compaction the nozzle had a bulk density of 2.55 g/cm$^3$. The nozzle was then slowly fired in a kiln over a period of 16 hours to 600° C. to remove the organic binder. The nozzle was then heated to 1450° C.–1480° C. at a rate of 70° C. per hour, and maintained at this temperature for 10 hours. After firing the nozzle was allowed to cool in the kiln.

The fired nozzle had a bulk density of 4.60 g/cm$^3$ and zero apparent porosity (assuming an absolute density of 4.60 g/cm$^3$). A similar nozzle made from plasma dissociated zircon but containing no iron oxide had a bulk density after compaction of 2.55 g/cm$^3$, a bulk density after firing of 3.75 g/cm$^3$ and an apparent porosity after firing of 18.5%.

The nozzle of the invention was found to be particularly useful for use in vessels containing aluminium-killed steel, due it is believed to its low porosity not allowing influx of oxygen and hence oxidation of the aluminium in the steel.

EXAMPLE 2

Various zircon ceramic bodies were produced using the mixing, compaction and firing procedures described in Example 1 and using different types of zircon and their fired bulk density, apparent porosity, thermal shock resistance, and abrasion resistance were compared.

The results obtained are tabulated below together with details of the compositions:

| Type of zircon | Oxide Addition | Bulk Density g/cm$^3$ | Apparent porosity % | Thermal shock Resistance | Abrasion Resistance |
|---|---|---|---|---|---|
| Milled zircon (all less than 0.104 mm) | nil | 3.4 | 30–35 | Good | Poor |
| Milled zircon (all less than 0.104 mm) | 1% Fe$_2$O$_3$ | 3.7 | 25 | Poor | Good |
| Milled zircon (all less than 0.104 mm) | 2% MgO | 3.4 | 30–35 | Good | Good |
| Zircon Sand | nil | 3.4 | 30–35 | Good | Poor |
| Zircon sand + Milled Zircon (all less than 0.104 mm) | nil | 3.5 | 28–30 | Good | Poor |
| Zircon sand + Milled Zircon (all less than 0.104 mm) | 2% MgO | 3.5 | 28–30 | Good | Good |
| Micronised zircon (10μ) | nil | 3.9 | 18 | Poor | Good |
| Micronised zircon (10μ) | 2% MgO | 3.9–4.0 | 14–18 | Poor | Good |
| Micronised zircon (10μ) | 1% Fe$_2$O$_3$ | 3.9–4.0 | 14–18 | Poor | Good |
| Plasma dissociated zircon (mean particle size 2.6 microns) | nil | 3.7–3.9 | 18–23 | Good | Good |
| Plasma dissociated zircon (mean particle size 2.6 microns) | 1% Fe$_2$O$_3$ | 4.6 | 0–2 | Good | Very Good |
| Plasma dissociated zircon (mean particle size 2.6 microns) | 2% MgO | 4.4 | <5 | Good | Very Good |

The apparent porosity was calculated from the observed density (fired bulk density) and the theoretical (absolute density), assuming a theoretical density of 4.60 g/cm$^3$.

The thermal shock resistance and abrasion resistance tests referred to in the table above were empirical tests rather than standard laboratory tests. The difficulty of carrying out meaningful tests on refractory materials for use in molten metal casting has been well described by C. W. Hardy and G. P. Carswell in Transactions of the British Ceramic Society, Volume 75 No. 6 November/December 1976 "Testing of Refractories for Casting Bay Applications" and an oxyacetylene flame test analogous to that described in that paper was used to test the ceramics of the present invention. The oxyacetylene flame torch was adjusted to maximum flame temperature (about 3000° C.) with a flame length of 6 to 9 mm. The body shape tested was that of a nozzle and the flame was slowly passed along the inner (generally cylindrical) surface of the nozzle. If the nozzle tended to crack, the thermal shock resistance was assessed as poor while if there was no evidence of cracking, the thermal shock resistance was assessed as good.

Abrasion resistance was estimated by attempting to wear away a substantially right-angled ridge, e.g. the edge of a cube, using as abrader a 50 mm wide flexible abrasive belt mounted on a 50 mm wide block of wood; the alumina on the abrasive belt was 0.5 mm particle size.

In some cases, a few strokes using such an abrasive belt at moderate hand pressure is sufficient to wear away the edge or ridge to a flat; such materials were classified as having poor abrasion resistance. If a flat could only be worn with great difficulty, and with much tearing out of alumina particles from the abrasive pad, abrasion resistance was classified as good. If all that happened was destruction of the abrasive belt without any observable change in the edge, the abrasion resistance was classified as "very good".

As can be seen from the table only the zircon compositions of the invention give bodies having a combination of high bulk density and extremely low porosity with good thermal shock resistance and good or very good abrasion resistance.

EXAMPLE 3

Zircon ceramic bodies were prepared from plasma dissociated zircon (mean particle size 5.8 microns) and cobalt oxide in proportions ranging from 1% to 4% by weight, using the following procedure:

The plasma dissociated zircon and cobalt oxide were mixed together using a paddle mixer. The resulting mixture was fed through a high speed powder blender of 200 g capacity in batches, and the batches were then returned to the paddle mixer and mixed together.

An 18% by weight aqueous solution of polyacrylamide having a molecular weight of approximately 100,000 was added to the zircon-cobalt oxide mixture in the paddle mixer at a rate of 8 ml of solution per 100 g of powder, and mixing was continued until a free-flowing granular powder was formed.

The granular powder was then pressed at a pressure of 420 kg/cm² into 10 cm × 1.5 cm × 1 cm rectangular bars.

The bars were dried in an oven and fired in a kiln at 1480° C. for 5 hours. Prior to firing the density of the bars was 2.50 g/cm³. After firing the bars were allowed to cool and bulk density and apparent porosity determinations were then made.

Similar bars were prepared from plasma dissociated zircon of mean particle size 5.8 microns and containing no cobalt oxide.

The following results were obtained:

| % Cobalt Oxide | Bulk Density g/cm³ | Apparent Porosity % |
|---|---|---|
| 0 | 3.30 | 27.2 |
| 1 | 3.90 | 15.2 |
| 2 | 4.07 | 11.4 |
| 3 | 4.15 | 9.7 |
| 4 | 4.18 | 9.0 |

I claim:

1. A highly thermal shock resistant, highly abrasion resistant ceramic body having a porosity of less than 5%, said body being formed by firing for about ten hours at a temperature of at least 1350° C., a composition comprising 95 to 99.5% by weight plasma dissociated zircon and 0.5 to 5.0% by weight of an oxide selected from the class consisting of alkaline earth metal oxides and transition metal oxides, the particle size of all the components being less than 0.053 mm.

2. A ceramic body according to claim 1 wherein the oxide is of a transition metal and is present in an amount of 0.5 to 4% by weight of the plasma dissociated zircon.

3. A ceramic body according to claim 1 wherein the oxide is iron oxide and is present in a proportion of 0.5 to 1.5% by weight of the plasma dissociated zircon.

4. A ceramic body according to claim 1 wherein the oxide is magnesium oxide and is present in a proportion of 1 to 3% by weight of the plasma dissociated zircon.

5. A ceramic body according to claim 1 which includes a further material selected from the class consisting of refractory oxides, carbides, silicates and graphite.

6. In the method of forming a highly thermal shock resistant, highly abrasion resistant ceramic body having a porosity of less than 5%, said method comprising providing a composition comprising 95 to 99.5% by weight plasma dissociated zircon and 0.5 to 5.0% by weight of an oxide selected from the class consisting of alkaline earth metal oxides and transition metal oxides, the particle size of all the components being less than 0.053 mm, compressing said composition into a body and firing said body for about ten hours at a temperature of at least 1350° C.

7. The method of claim 6 which includes the step of incorporating an organic binder into the composition in order to assist forming the composition to the desired shape.

8. The method of claim 6 wherein the firing is carried out to a temperature in the range of 1350° to 1500° C.

* * * * *